United States Patent
Lee

(10) Patent No.: US 7,545,413 B2
(45) Date of Patent: Jun. 9, 2009

(54) METHOD AND APPARATUS FOR DISPLAYING IMAGES USING DUPLEX THUMBNAIL MODE

(75) Inventor: Se-hyun Lee, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 827 days.

(21) Appl. No.: 11/083,387

(22) Filed: Mar. 18, 2005

(65) Prior Publication Data
US 2006/0103753 A1 May 18, 2006

(30) Foreign Application Priority Data
Nov. 18, 2004 (KR) .................. 10-2004-0094553

(51) Int. Cl.
*H04N 9/68* (2006.01)
(52) U.S. Cl. ............. 348/231.2; 348/231.3; 348/333.02
(58) Field of Classification Search .............. 348/231.2, 348/231.3, 333.02, 333.05
See application file for complete search history.

(56) References Cited

U.S. PATENT DOCUMENTS

| 6,445,412 | B1 | 9/2002 | Shiohara |
| 6,738,075 | B1 * | 5/2004 | Torres et al. ............. 715/723 |
| 6,847,388 | B2 * | 1/2005 | Anderson .................. 715/854 |
| 6,879,342 | B1 * | 4/2005 | Miller et al. .......... 348/333.05 |
| 7,408,582 | B2 * | 8/2008 | Prabhu et al. .......... 348/333.05 |
| 2001/0030706 | A1 * | 10/2001 | Miller et al. .......... 348/333.05 |
| 2003/0112357 | A1 * | 6/2003 | Anderson .............. 348/333.05 |

FOREIGN PATENT DOCUMENTS

| CN | 1496103 A | 5/2004 |
| CN | 1517950 A | 8/2004 |

OTHER PUBLICATIONS

Microsoft Corporation, "Working with Photos. Picture Perfect: Transferring Images to Your Computer", Internet Publication at http://www.microsoft.com/windowsME/using/photos/articles/transimg.asp (Dec. 20, 2000).
Microsoft Corporation, "Organizing and Viewing Photos With Image Browsers," Internet Publication at http://www.microsoft.com/windowsxp/using/digitalphotography/learnmore/browsers.mspx (May 1, 2002).

* cited by examiner

*Primary Examiner*—James M Hannett
(74) *Attorney, Agent, or Firm*—Drinker Biddle & Reath LLP

(57) ABSTRACT

A method and apparatus for displaying images is provided. In particular, provided are a method and apparatus for displaying images using a duplex thumbnail mode in which images larger than thumbnail images are created when photographing images to display a larger image together with a corresponding activated thumbnail image whenever the thumbnail image is activated. The apparatus includes a signal processing unit that displays a first thumbnail image that is of the same size or larger than a second thumbnail image together with the second thumbnail image whenever the second thumbnail image is activated among displayed thumbnail images.

19 Claims, 7 Drawing Sheets

METHOD AND APPARATUS FOR DISPLAYING IMAGES USING DUPLEX THUMBNAIL MODE

BACKGROUND OF THE INVENTION

This application claims the priority of Korean Patent Application No. 10-2004-0094553, filed on Nov. 18, 2004 in the Korean Intellectual Property Office, the disclosure of which is incorporated herein in its entirety by reference.

1. Field of the Invention

The present invention relates to a method and apparatus for displaying images, and more particularly, to a method and apparatus for displaying images using a duplex thumbnail mode, in which images larger than thumbnail images are created when photographing, to display an activated thumbnail image together with a larger version of the activated thumbnail image.

2. Description of the Related Art

Digital camera technology is still relatively new, but it is quickly advancing in refinement and popularity. Digital cameras store images as binary data and can directly transfer the images to a computer without having to develop, print, or scan the images.

Digital cameras use imaging devices such as charge coupled devices (CCDs) to convert electrical image signals into digital signals, and digital signals of the photographed subject are stored in a memory or relevant data is output via an output device through a compression/restore operation of the digital camera.

Digital cameras store image data in memory cards or similar digital storage media instead of on film like conventional cameras. Thus, digital cameras avoid the inconvenience and storage limits of film, allowing the user to immediately access images by using a computer to read the stored images from the digital camera's memory card.

That is, by outputting the image data to a computer monitor, the photographic images may be checked without having to additionally develop the images. In addition, the digital images may be easily edited according to the desire of the user. This allows easy enlargement and reduction, as well as touching up or other modifications to improve the state of the photographed image as the user sees fit.

Such digital cameras support a thumbnail mode which displays a plurality of images on a single screen to conveniently reproduce the photographed images. For the reproduction of the thumbnail image mode, common images and thumbnail images are created and stored together when reproducing image files after photographing the images, and the thumbnail images are retrieved from the image files and displayed when reproducing the thumbnail images. The thumbnail mode can make searching through the photographed images quicker and more convenient.

However, the thumbnail images reproduced on a screen are small, thus making it difficult to identify the state of the images. In order to identify the state of the thumbnail images that are activated by direction keys, the thumbnail images are enlarged, the state of the thumbnail images are checked, and then the digital camera returns to the thumbnail mode to continue the image search. As a result, unnecessary operations cause inconvenience in using the thumbnail mode.

SUMMARY OF THE INVENTION

The present invention provides a method and apparatus for displaying images using a duplex thumbnail mode in which images larger than thumbnail images are created in addition to a main image when photographing a subject in order to display an activated thumbnail image together with a larger version of the activated thumbnail image.

According to an embodiment of the present invention, there is provided an apparatus for displaying images using a duplex thumbnail mode. The apparatus may include a signal processing unit that displays a first thumbnail image that is of the same size or larger than a second thumbnail image together with the second thumbnail image, whenever the second thumbnail image is activated among a plurality of displayed thumbnail images. The signal processing unit creates the second thumbnail image by reducing the first thumbnail image. The signal processing unit displays the first thumbnail image in a region that does not overlap the second thumbnail image.

According to another embodiment of the present invention, there is provided a method of displaying images using a duplex thumbnail mode. The method may include: activating a second thumbnail image from among a plurality of displayed thumbnail images; and displaying a first thumbnail image that is of the same size or larger than the activated second thumbnail image, together with the activated second thumbnail image. The second thumbnail image is created by reducing the first thumbnail image, and the first thumbnail image is displayed in a region that does not overlap the second thumbnail image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
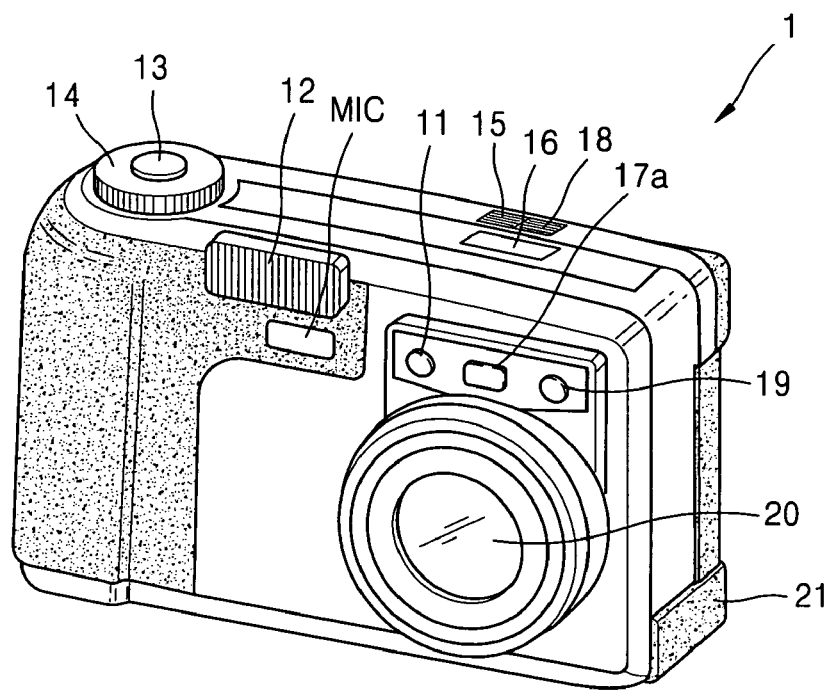
FIG. 1 is a perspective view of the front of a digital camera according to an embodiment of the present invention.

FIG. 1 is a perspective view of the front of a digital camera 1 according to an embodiment of the present invention.

Referring to FIG. 1, the digital camera 1 includes a microphone MIC, a self-timer lamp 11, a flash 12, a viewfinder 17a, a flash sensor (FS) 19, and a lens unit 20, on its front; a shutter button 13, a mode dial 14, a function-select button 15, a photograph-information displaying unit 16, and a function-block button 18, on its top; and an external interface 21 on its side.

When the digital camera is in a self-timer mode, the self-timer lamp 11 operates during a time period from when the shutter button 13 is pressed until the shutter starts operating.

The mode dial 14 is used by a user to select various operating modes, for example, a still image photographing mode, a night scene photographing mode, a moving picture photographing mode, a play mode, a computer connection mode, and a system setup mode.

The function-select button 15 is used by the user to select one operating mode from, for example, a still image photographing mode, a night scene photographing mode, a moving picture photographing mode, and a play mode of the digital camera 1.

The photograph-information displaying unit 16 displays various information on photographic functions. The function-block button 18 is used by the user to select one of the functions displayed on the photograph-information displaying unit 16.

Figure 2:
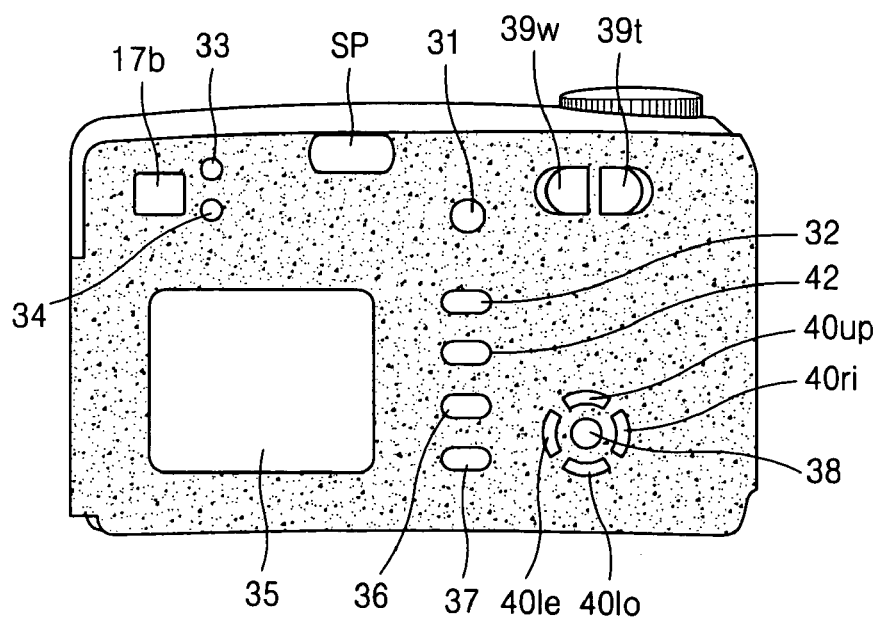
FIG. 2 is a rear view of the digital camera of FIG. 1.

FIG. 2 is a rear view of the digital camera 1 of FIG. 1.

Referring to FIG. 2, a speaker SP, a power button 31, a monitor button 32, an autofocus lamp 33, a viewfinder 17b, a flash standby lamp 34, a display panel 35 (e.g., a liquid crystal display (LCD)), an exposure compensation/delete button 36, an enter/play button 37, a menu/OK button 38, a wide-angle zoom button 39w, a telephoto zoom button 39t, an up button 40up, a right button 40ri, a down button 40lo, a left button 40le, and a playback button 42 are included on the back of the digital camera 1.

The monitor button 32 is used by the user to control the operation of the display panel 35. For example, if the user presses the monitor button 32 once, an image of a subject is displayed together with photographing information on the display panel 35. When the monitor button 32 is pressed for a second time, only the image of the subject is displayed on the display panel 35, and when the monitor button 32 is pressed for a third time, the display panel 35 is switched off.

The autofocus lamp 33 operates when an autofocus operation is completed.

The flash standby lamp 34 operates when the flash 12 (see FIG. 1) is in a standby state.

When the digital camera 1 is operated manually, the exposure compensation/delete button 36 controls the amount of light. When the user is setting an operating mode, the exposure compensation/delete button 36 is used as a delete button.

The enter/play button 37 is used by the user to input data or to instruct the digital camera 1 to perform various functions. For example, the enter/play button 37 is used to stop or play files while the camera is in the play mode.

The menu/OK button 38 is used to display and select a menu of a mode selected by the mode dial 14.

The up button 40up, the right button 40ri, the down button 40lo, and the left button 40le are used by a user to select the modes and to change a display location of the image within the display panel 35.

The playback button 42 is used to view and reproduce the last photographed image, moving picture, or audio clip.

Figure 3:
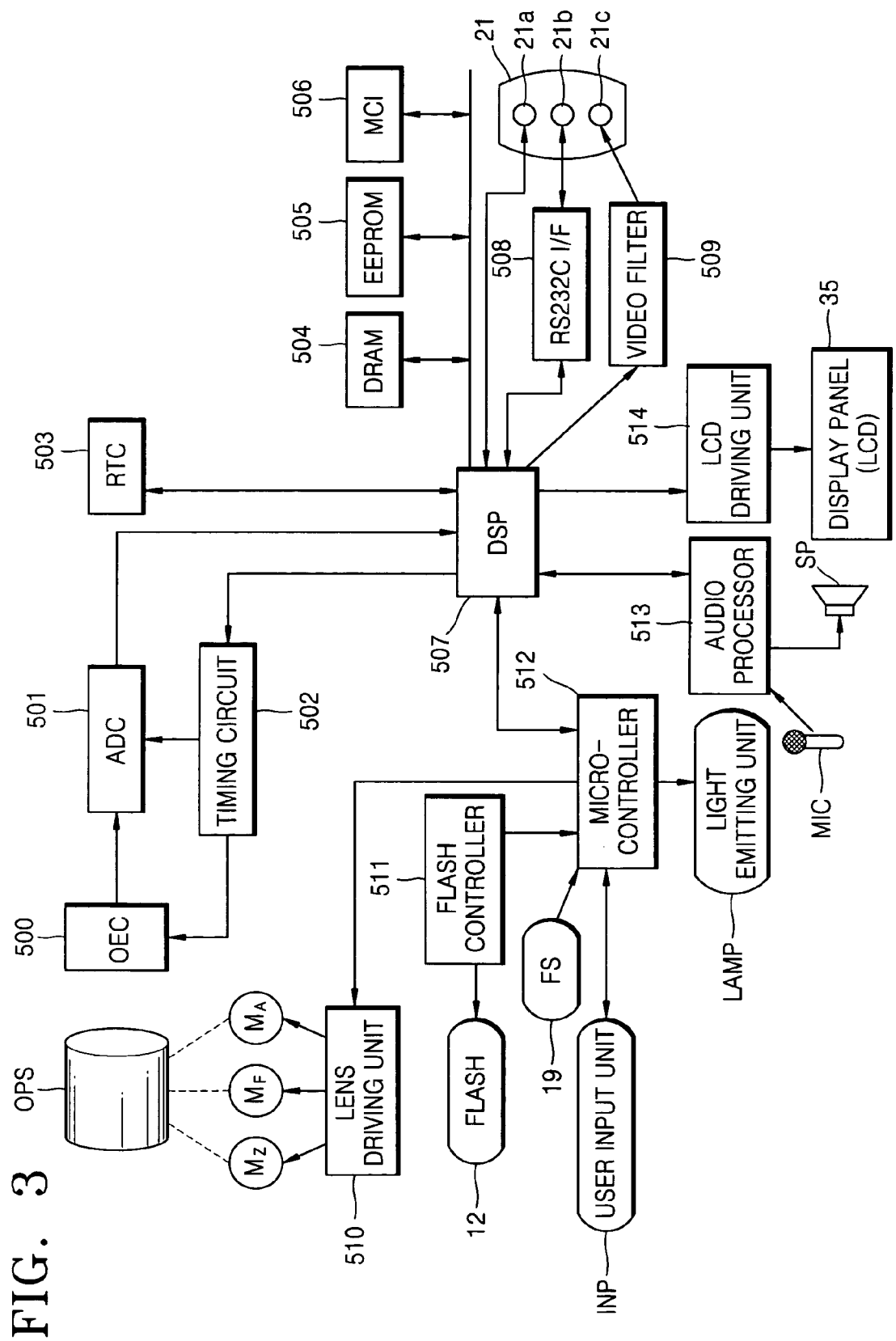
FIG. 3 is a block diagram of the structure of the digital camera of FIGS. 1 and 2.

FIG. 3 is a block diagram of the structure of the digital camera 1 of FIGS. 1 and 2. The structure of the digital camera 1 will now be discussed with reference to FIGS. 1 through 3.

An optical system OPS including the lens unit 20 optically processes light reflected from a subject. The lens unit 20 of the optical system OPS includes a zoom lens, a focus lens, and a compensation lens (not shown).

If a user presses the wide-angle zoom button 39w (see FIG. 2) or the telephoto zoom button 39t (see FIG. 2), a corresponding signal is input to a micro-controller 512. Accordingly, the micro-controller 512 controls a lens driving unit 510, and a zoom motor $M_z$ operates, thereby moving the zoom lens. That is, if the wide-angle zoom button 39w is pressed, the focal length of the zoom lens is decreased, thus increasing the view angle. Conversely, if the telephoto zoom button 39t is pressed, the focal length of the zoom lens is increased, thus decreasing the view angle.

A focus motor $M_F$ operates to adjust the focal lens.

Reference character $M_A$ denotes a motor to drive an aperture (not shown). A rotation angle of the aperture driving motor $M_A$ is different when the digital camera 1 is in a specific exposure mode than it is when the digital camera 1 is in other modes. The specific exposure mode is used to set photographing conditions based upon a brightness level of a region of the subject to be photographed. When a part of an image region that the user wants to see coincides with a specific area detect region displayed on the display panel 35 of the digital camera 1, a light amount of the digital camera 1 is set regarding a mean brightness value of the specific area detect region.

A photoelectric converter (OEC) 500 of a charge coupled device (CCD) or complementary metal oxide semiconductor (CMOS) converts light from the optical system OPS into electrical analog signals. A digital signal processor (DSP) 507 controls a timing circuit 502 to control the operation of the OEC 500 and an analog-to-digital converter (ADC) 501. The ADC 501 processes the analog signals output from the OEC 500 into digital signals after removing high frequency noise and altering their bandwidth. The DSP 507 processes the digital signals output from the ADC 501 and generates digital image signals divided into chrominance signals and luminance signals.

A light emitting unit LAMP that is operated by the micro-controller 512 includes the self-timer lamp 11 (see FIG. 1), the automatic focus lamp 33 (see FIG. 2), and the flash standby lamp 34 (see FIG. 2).

A user input unit INP includes the shutter button 13 (see FIG. 1), the mode dial 14 (see FIG. 1), the function-select button 15 (see FIG. 1), the function-block button 18 (see FIG. 1), the monitor button 32 (see FIG. 2), the exposure compensate/delete button 36 (see FIG. 2), the enter/play button 37 (see FIG. 2), the menu/OK button 38 (see FIG. 2), the wide-angle zoom button 39w (see FIG. 2), the telephoto zoom button 39t (see FIG. 2), the up button 40up (see FIG. 2), the right button 40ri (see FIG. 2), the down button 40lo (see FIG. 2), the left button 40le (see FIG. 2), and the playback button 42 (see FIG. 2).

The digital image signal output from the DSP 507 is temporarily stored in a dynamic random-access memory (DRAM) 504. Setting data and algorithms needed for the operation of the DSP 507 are stored in an electrically erasable and programmable read-only memory (EEPROM) 505.

A memory card of a user is removably installed in a memory card interface (MCI) 506.

The digital image signal output from the DSP 507 is input to an LCD driving unit 514. As a result, an image is displayed on the display panel 35, that is, the LCD.

The digital image signal output from the DSP 507 can be transmitted in a serial form via a universal serial bus (USB) connector 21a or an RS232C interface 508 and its connector 21b. The digital image signal output from the DSP 507 can also be transmitted as video signals via a video filter 509 and a video outputting unit 21c.

An audio processor 513 relays an audio signal from the microphone MIC to the DSP 507 or to the speaker SP. The audio processor 513 also outputs an audio signal from the DSP 507 to the speaker SP.

Meanwhile, the flash 12 is operated via a flash controller 511 and the micro-controller 512 according to a signal from the FS 19.

Figure 4:
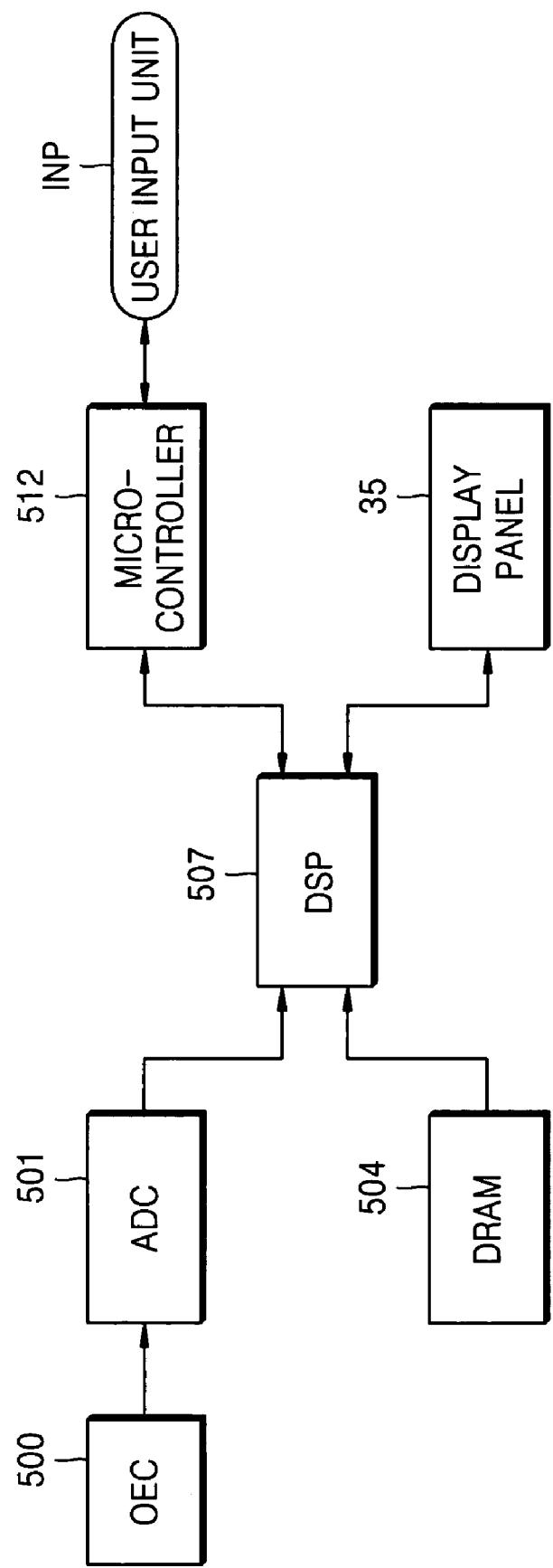
FIG. 4 is a block diagram of an apparatus for displaying images using a duplex thumbnail mode according to an embodiment of the present invention.

FIG. 4 is a block diagram of an apparatus for displaying images using a duplex thumbnail mode according to an embodiment of the present invention. The apparatus includes the OEC 500, the ADC 501, the DRAM 504, the DSP 507, the micro-controller 512, the user input unit INP, and the display panel 35.

The micro-controller 512 provides numerous menus for setting photographing conditions of the digital camera 1. In particular, the micro-controller 512 provides a thumbnail mode menu for searching through images after photographing. Before photographing, the user may set the photographing conditions of the digital camera using the user input unit INP via a menu provided by the micro-controller 512. The photographing conditions of the digital camera which the user sets may include, for example, a sensitivity of the digital camera, a size of the images (resolution), an exposure time, etc.

The set photographing conditions are then used when the user photographs a subject. During photographing, the OEC 500 converts light reflected from a subject into electrical signals. Then, the ADC 501 converts the electrical signals into digital signals.

Figure 5:
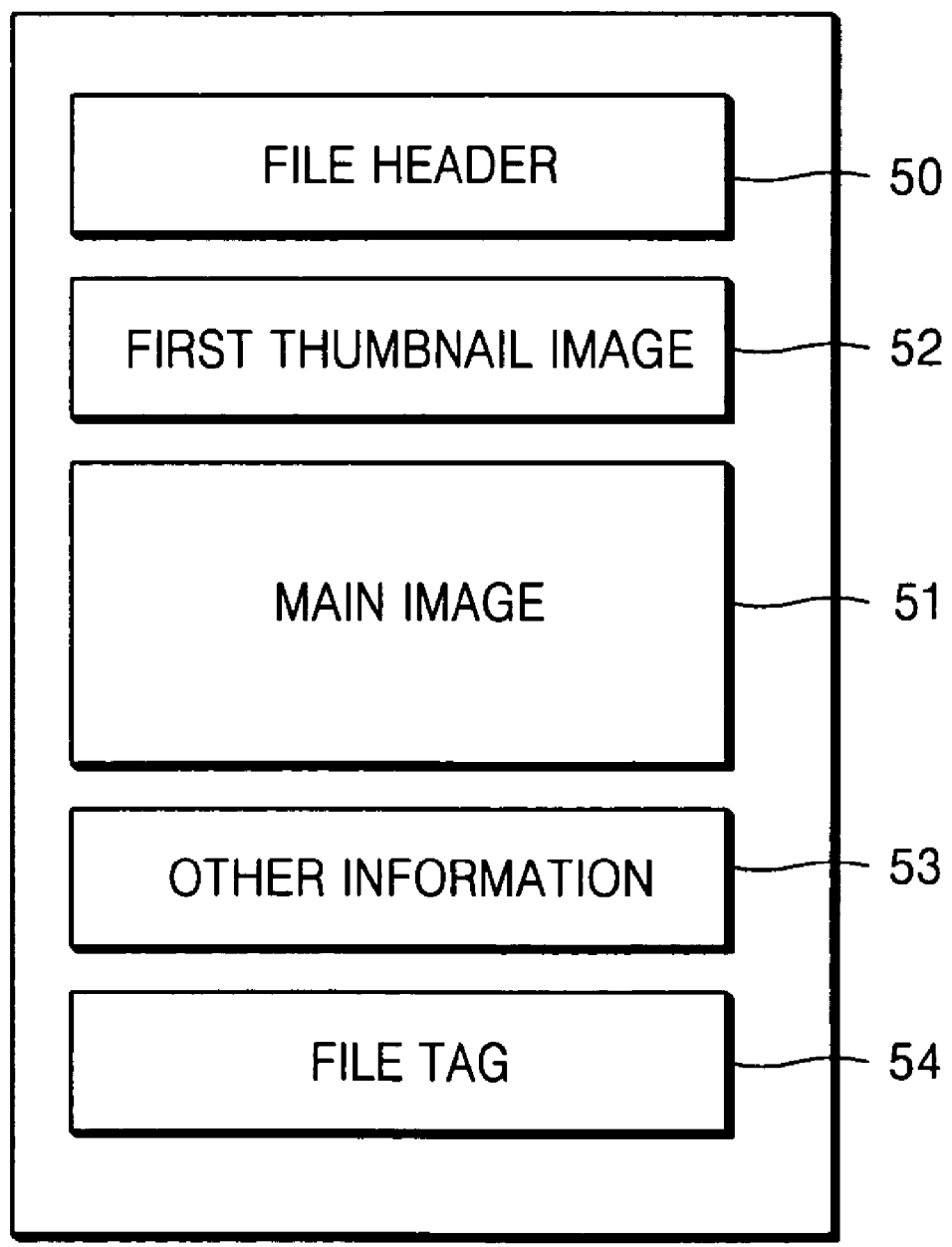
FIG. 5 is a view illustrating the structure of an image file that is generated when photographing images according to an embodiment of the present invention.

The DSP 507 uses the digital image signals to generate image files that can be used in the digital camera 1. FIG. 5 illustrates the structure of the image file that is generated when photographing takes place.

When the image is captured, the DSP 507 generates the image file including a file header 50, a main image 51, a first thumbnail image 52 that is smaller than the main image 51 but larger than a second thumbnail image 55 (see FIGS. 6 and 7), other information 53, and an image file tag 54.

Figure 6:
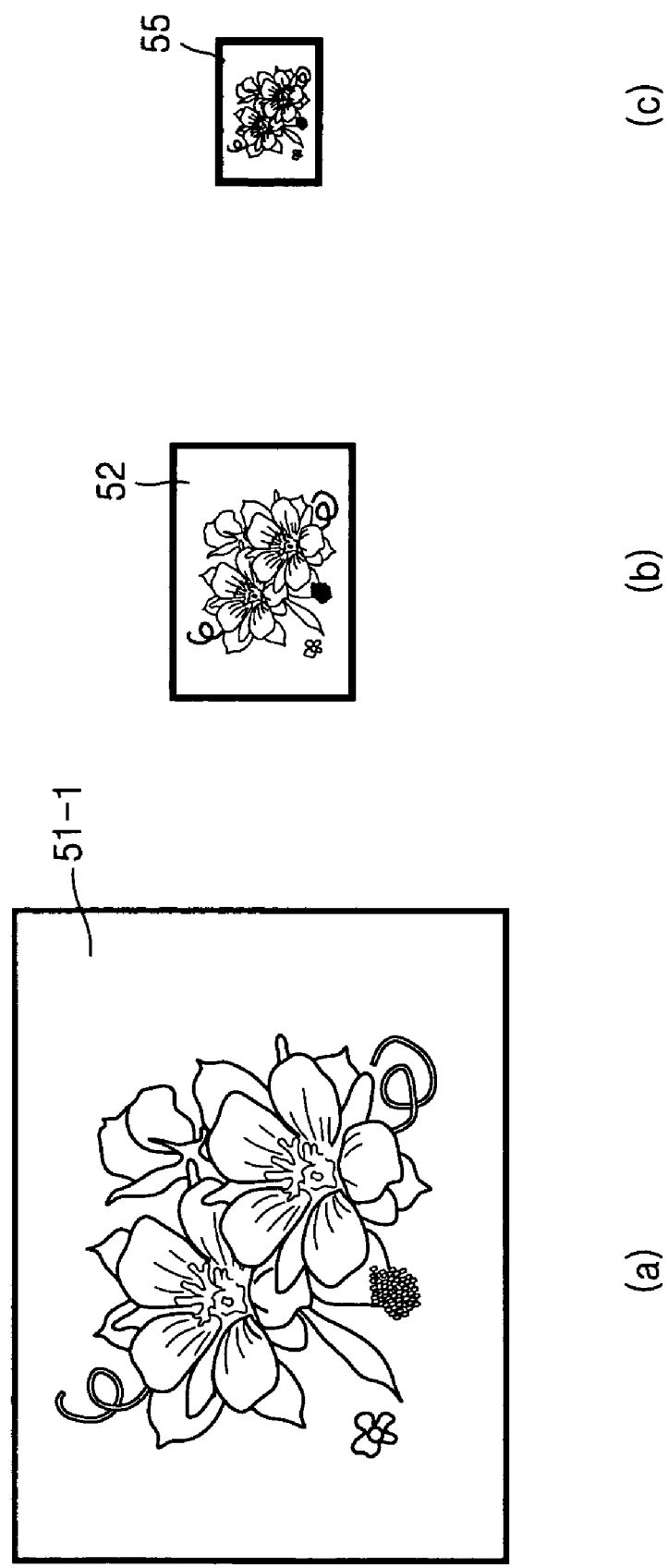
FIG. 6 is a view illustrating different sizes of images that are generated when photographing the images according to an embodiment of the present invention.

FIG. 6 is a view illustrating the different sizes of images that are generated when photographing the images according to an embodiment of the present invention. Part (a) of FIG. 6 illustrates an image 51-1 in which the main image 51 of the image file illustrated in FIG. 5 is reduced to fit the set resolution of the display panel 35, part (b) of FIG. 6 illustrates the first thumbnail image 52 of the image file illustrated in FIG. 5, and part (c) of FIG. 6 illustrates the second thumbnail image 55 which is a reduction of the first thumbnail image 52.

The generated image files are stored in the DRAM 504 or a memory card (not shown) under the control of the micro-controller 512.

When the image 51-1 is currently displayed on the display panel 35, if the duplex thumbnail mode is selected or the wide-angle zoom button 39w (see FIG. 2) is pressed, the micro-controller 512 controls the DSP 507 to display the second thumbnail images 55 corresponding to a predetermined number of the main images 51 stored in the DRAM 504 or a memory card (not shown). The DSP 507 reduces the first thumbnail image 52 to create the second thumbnail image 55. If the duplex thumbnail mode is set to 9 divisions, the micro-controller 512 controls the DSP 507 to display 9 second thumbnail images 55 on the display panel 35. If the duplex thumbnail mode is set to 16 divisions, the micro-controller 512 controls the DSP 507 to display 16 second thumbnail images 55 on the display panel 35.

The DSP 507 accesses the DRAM 504 or the memory card to display a predetermined number of second thumbnail images with the second thumbnail image 55 that corresponds to the currently displayed image 51-1 on the display panel 35, in the duplex thumbnail mode.

When the second thumbnail images 55 are displayed on the display panel 35, the user uses the up button 40up, the right button 40ri, the down button 40lo, and the left button 40le to search for an image. Whenever one of the second thumbnail images 55 is activated by the up button 40up, the right button 40ri, the down button 40lo, or the left button 40le, the DSP 507 displays a first thumbnail image 52 corresponding to the second thumbnail image 55 on a region of the display panel 35. Here, the DSP 507 displays the first thumbnail image 52 and second thumbnail image 55 on different regions of the same screen so that they do not overlap each other.

Figure 7:
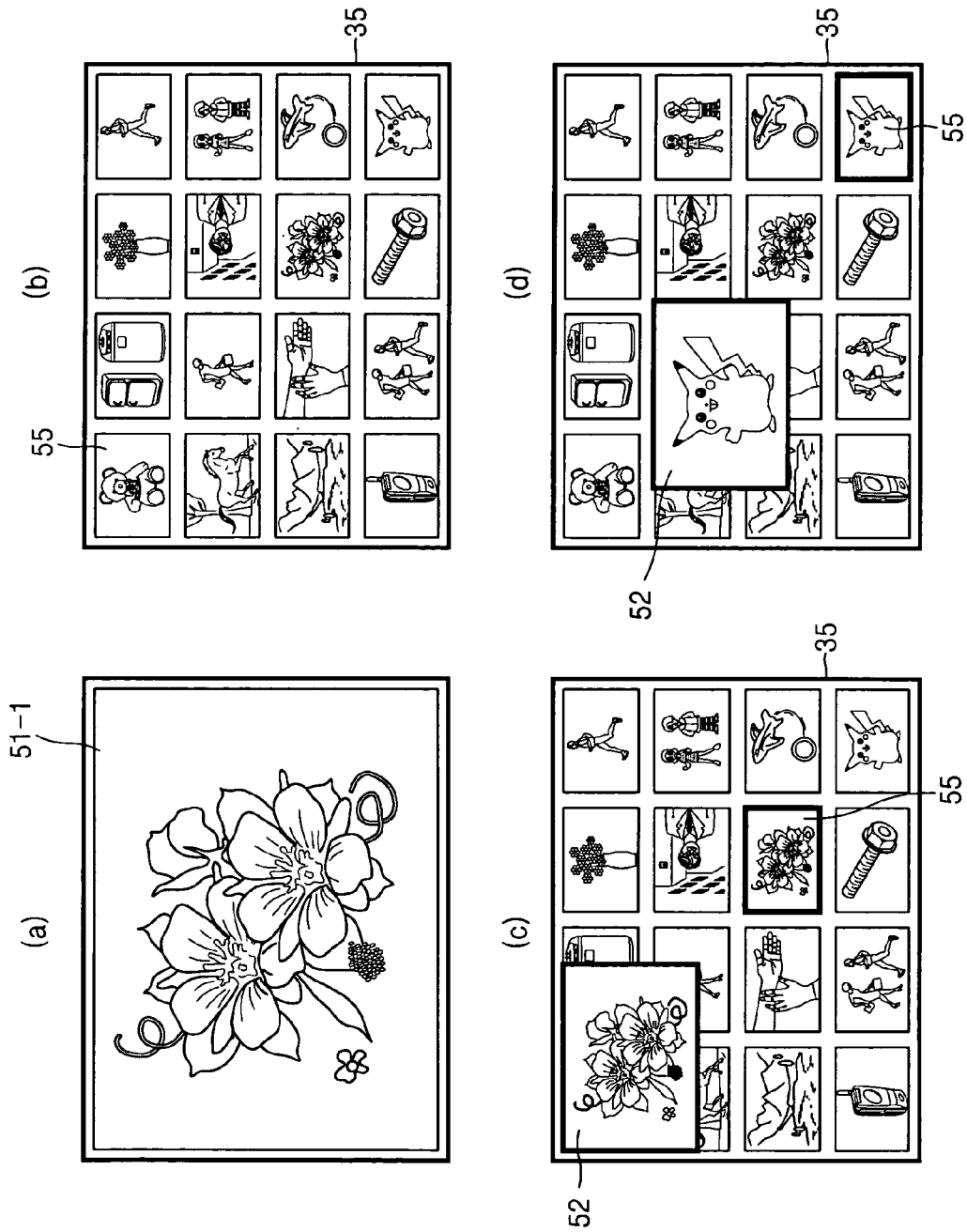
FIG. 7 is a view illustrating how images are displayed using the duplex thumbnail mode according to an embodiment of the present invention.

FIG. 7 is a view illustrating how images are displayed using the duplex thumbnail mode according to an embodiment of the present invention. Part (a) of FIG. 7 illustrates the image 51-1 in which the main image 51 is reduced to fit the resolution of the display panel 35 in a general reproducing mode. Part (b) of FIG. 7 illustrates when the thumbnail mode menu is selected to search for other images when the image 51-1 of part (a) of FIG. 7 is currently displayed, or when the wide-angle zoom button 39w (see FIG. 2) is pressed and a predetermined number of the second thumbnail images 55 (e.g., 16) are displayed. Parts (c) and (d) of FIG. 7 illustrate the appearance of the display screen 35 when the digital camera is in the duplex thumbnail mode and the first thumbnail images 52 that correspond to second thumbnail images 55 are displayed when searching for second thumbnail images 55 using the up button 40up, the right button 40ri, the down button 40lo, or the left button 40le.

Conventionally, it was difficult to identify the state of images by conducting an image search while the second thumbnail images 55 were displayed as illustrated in part (b) of FIG. 7. However, by providing larger first thumbnail images 52 that correspond to the second thumbnail images 55 as illustrated in parts (c) and (d) of FIG. 7 in the present invention, it is easier to identify the state of the displayed images.

Figure 8:
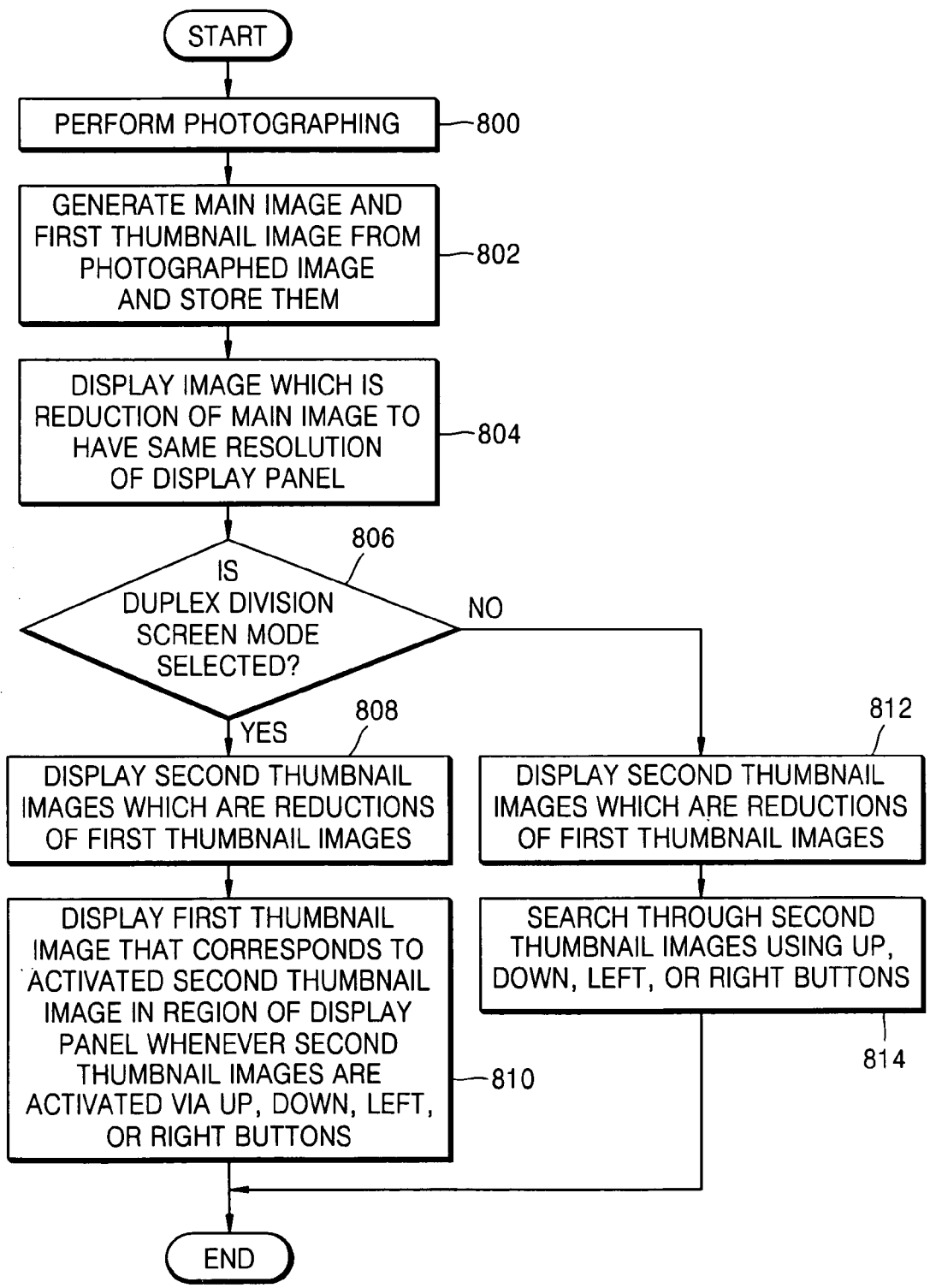
FIG. 8 is a flow chart illustrating a method of displaying images using a duplex thumbnail mode according to an embodiment of the present invention.

FIG. 8 is a flow chart illustrating a method of displaying the images using the duplex thumbnail mode according to an embodiment of the present invention. The method of FIG. 8 will now be described with reference to FIGS. 4, 5, and 8.

After the photographing conditions of the digital camera 1 have been set, photographing is performed when the OEC 500 converts light reflected from a subject into electrical signals, and the ADC 501 converts the electrical signals into digital signals (operation 800).

Then, the DSP 507 generates the image files including the file header 50, the main image 51, the first thumbnail image 52 that is smaller than the main image 51 but is larger than the second thumbnail image 55 (see FIGS. 6 and 7), the other information 53, and the file tag 54 from the digital image signals, as illustrated in FIG. 5 (operation 802).

Then, the DSP 507 displays the image 51-1, which is a reduction of the main image 51 to fit the resolution of the display panel 35 as illustrated in part (a) of FIG. 7 (operation 804).

If the duplex thumbnail mode is selected when the image 51-1 is displayed, the DSP 507 displays the second thumbnail images 55 on the screen of the display panel 35 as illustrated in part (b) of FIG. 7 (operations 806 and 808). Here, the DSP 507 reduces the first thumbnail images 52 of the image file to generate the second thumbnail images 55.

The DSP 507 displays the first thumbnail image 52 which corresponds to the second thumbnail image 55 at any region of the screen whenever the second thumbnail images 55 are activated using the up button 40up, the right button 40ri, the down button 40*lo*, or the left button 40*le* as illustrated in (c) and (d) of FIG. 7 (operation 810). Here, the DSP 507 displays the first thumbnail image 52 and its corresponding second thumbnail image 55 at different regions of the screen so that they do not overlap each other.

If a general thumbnail mode is selected instead of the duplex thumbnail mode when the image 51-1 is displayed, the DSP 507 displays the second thumbnail images 55 on the screen of the display panel 35 as illustrated in part (b) of FIG. 7 and the user searches through the second thumbnail images 55 using the up button 40*up*, the right button 40*ri*, the down button 40*lo*, or the left button 40*le* (operations 812 and 814).

As described above, by generating images that are larger than thumbnail images along with main images while photographing, and displaying a larger version of an activated thumbnail image together with the activated thumbnail image, the states of the activated thumbnail images are easily distinguishable. Thus, the user needs to switch between a general viewing mode and a thumbnail mode less frequently, thereby enjoying greater convenience.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An image display apparatus, the apparatus comprising:
    a display screen;
    a storage medium; and
    a digital signal processor, wherein the signal processor performs steps comprising:
        creating a plurality of image files in the storage medium, wherein the image files each comprise one of a plurality of main images and one of a plurality of first thumbnail images;
        generating a plurality of second thumbnail images, wherein each second thumbnail image corresponds to one of the plurality of first thumbnail images; and the second thumbnail image is generated from the corresponding first thumbnail image;
        displaying the plurality of second thumbnail images;
        determining whether the apparatus is in a duplex-thumbnail mode; and
        if the apparatus is in a duplex-thumbnail mode, displaying a selected second thumbnail image of the plurality of second thumbnail images along with its corresponding first thumbnail image.

2. The apparatus of claim 1, wherein the displayed first thumbnail image and the displayed second thumbnail image do not overlap on the display screen.

3. The apparatus of claim 1, wherein the size of the second thumbnail image does not exceed the size of the first thumbnail image.

4. The apparatus of claim 1, wherein each of the plurality of image files further comprises:
    a file header;
    a file tag; and
    a section for other information.

5. The apparatus of claim 1, wherein the storage medium is a memory card that is received by a memory card interface.

6. The apparatus of claim 1, the apparatus further comprising:
    a lens unit that receives light from a subject to be photographed by the apparatus; and
    a photoelectric device that converts the received light to electrical signals.

7. The apparatus of claim 1, wherein the digital signal processor performs farther steps comprising:
    displaying a single image on the display screen;
    detecting a user input; and
    in response to the user input, displaying the plurality of second thumbnail images.

8. The apparatus of claim 1, the apparatus further comprising a user input unit for generating command signals for selecting the duplex-thumbnail mode, for moving a cursor from one second thumbnail image of the plurality of second thumbnail images to another second thumbnail image of the plurality of second thumbnail images, and for selecting a second thumbnail image from among the plurality of second thumbnail images.

9. The apparatus of claim 7, wherein the single image is a reduced-resolution version of a corresponding main image.

10. A digital camera with a display screen, the digital camera comprising:
    a lens unit that receives light from a subject to be photographed by the digital camera;
    a photoelectric device that converts the received light to analog electrical signals;
    an analog-to-digital conversion unit that receives the analog electrical signals and converts them to digital signals;
    a mode selector from which camera operational modes may be selected, the camera operational modes including a duplex-thumbnail mode;
    a digital signal processor which receives the digital signals, processes the digital signals, and controls the digital camera to display images, wherein the digital signal processor performs steps comprising:
        generating a main image from the received digital signals;
        creating an image file in a storage medium, wherein the image file comprises the main image and a first thumbnail image;
        repeating the step of generating a main image from the received digital signals and the step of creating the image file in the storage medium;
        generating a plurality of second thumbnail images, wherein each second thumbnail image corresponds with one of the first thumbnail images; and each second thumbnail image of the plurality of second thumbnail images is generated from its corresponding first thumbnail image;
        displaying the plurality of second thumbnail images;
        determining whether the digital camera is in a duplex-thumbnail mode; and
        if the digital camera is in a duplex-thumbnail mode, displaying a selected second thumbnail image of the plurality of second thumbnail images along with its corresponding first thumbnail image.

11. A method of operating a digital camera comprising a display screen, a lens unit that receives light from a photographing subject of the digital camera, a photoelectric device that converts the received light to electrical signals, and a digital signal processor that receives and processes the signals, the method comprising:
    generating a main image of the photographing subject;

repeating the step of generating a main image of the photographing subject, thereby creating a plurality of main images;

creating a plurality of image files in a storage medium, wherein the image files each comprise one of the plurality of main images and one of a plurality of first thumbnail images;

generating a plurality of second thumbnail images, wherein each second thumbnail image corresponds to one of the plurality of main images; and each second thumbnail image of the plurality of second thumbnail images is generated from its corresponding first thumbnail image;

determining whether the digital camera is in a duplex-thumbnail mode; and in response to a determination that the digital camera is in a duplex-thumbnail mode, displaying a selected second thumbnail image of the plurality of second thumbnail images on the display screen along with its corresponding first thumbnail image.

12. The method of claim 11, wherein the step of displaying the selected second thumbnail image along with its corresponding first thumbnail image comprises displaying the first thumbnail image and the selected second thumbnail image on non-overlapping portions of the display screen.

13. The method of claim 11, wherein the size of each second thumbnail image of the plurality of second thumbnail images does not exceed the size of its corresponding first thumbnail image.

14. The method of claim 11, wherein each second thumbnail image is created by reducing the corresponding first thumbnail image.

15. The method of claim 11, further comprising displaying a screen-size image which comprises a reduction of a main image file such that the screen-size image has the same resolution as the display screen.

16. The method of claim 11, further comprising:
detecting a user input; and
in response to the user input, displaying additional second thumbnail images which represent additional main images stored on the storage medium.

17. The method of claim 11, further comprising:
detecting a user's manipulation of a directional button; and
in response to the detection of a user's manipulation of a directional button, activating a second thumbnail image of the plurality of second thumbnail images, wherein the activated second thumbnail image is displayed in a corresponding direction from a currently selected second thumbnail image.

18. The method of claim 17, further comprising:
displaying the activated second thumbnail image along with its corresponding first thumbnail image.

19. A method of operating a digital camera comprising a display screen, a lens unit that receives light from a photographing subject of the digital camera, a photoelectric device that converts the received light to electrical signals, and a digital signal processor that receives and processes the signals, the method comprising:

generating a main image of the photographing subject;

repeating the step of generating a main image of the photographing subject, thereby creating a plurality of main images;

creating a plurality of image files in a storage medium, wherein the image files each comprise one of the plurality of main images and one of a plurality of first thumbnail images;

generating a plurality of second thumbnail images, wherein each second thumbnail image corresponds to one of the plurality of main images;

determining whether the digital camera is in a duplex-thumbnail mode; and in response to a determination that the digital camera is in a duplex-thumbnail mode, displaying a selected second thumbnail image of the plurality of second thumbnail images on the display screen along with its corresponding first thumbnail image;

wherein the first thumbnail image overlaps at least one second thumbnail image other than the selected second thumbnail image.

* * * * *